United States Patent
Tada et al.

(10) Patent No.: US 9,353,324 B2
(45) Date of Patent: May 31, 2016

(54) COAL-BLENDED FUEL, METHOD FOR COMBUSTING THE SAME, AND COAL FUEL FOR USE IN COAL-BLENDED FUEL

(71) Applicant: Kabushiki Kaisha Kobe Seiko Sho (Kobe Steel, Ltd.), Kobe-shi (JP)

(72) Inventors: Toshiya Tada, Kobe (JP); Yoji Takubo, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 120 days.

(21) Appl. No.: 14/345,468

(22) PCT Filed: Oct. 12, 2012

(86) PCT No.: PCT/JP2012/076490
§ 371 (c)(1),
(2) Date: Mar. 18, 2014

(87) PCT Pub. No.: WO2013/054903
PCT Pub. Date: Apr. 18, 2013

(65) Prior Publication Data
US 2014/0352583 A1     Dec. 4, 2014

(30) Foreign Application Priority Data

Oct. 13, 2011   (JP) ................................ 2011 226137

(51) Int. Cl.
*C10L 9/10*     (2006.01)
*C10L 9/00*     (2006.01)
*C10L 5/04*     (2006.01)
(Continued)

(52) U.S. Cl.
CPC . *C10L 5/04* (2013.01); *C10L 1/326* (2013.01); *C10L 9/10* (2013.01); *F23D 1/005* (2013.01); *Y02E 50/30* (2013.01)

(58) Field of Classification Search
CPC ............ C10L 5/04; C10L 1/326; C10L 9/10; F23D 1/005; Y02E 50/30
See application file for complete search history.

(56) References Cited

U.S. PATENT DOCUMENTS

| | | | | |
|---|---|---|---|---|
| 4,119,409 A | * | 10/1978 | Aoki | ..................... C10B 57/04 44/550 |
| 4,252,539 A | * | 2/1981 | McMahon, Jr. | ........... C10L 5/00 44/504 |
| 2010/0006477 A1 | | 1/2010 | Okuyama et al. | |

FOREIGN PATENT DOCUMENTS

| JP | 11 82990 | 3/1999 |
|---|---|---|
| JP | 2006-70182 | 3/2006 |

(Continued)

OTHER PUBLICATIONS

Russell, et al. Consideration for Low Sulfur Coal Blending at BL England Station, 2004,MPR, white paper;pp. 1-18.*

(Continued)

*Primary Examiner* — Cephia D Toomer
(74) *Attorney, Agent, or Firm* — Oblon, McClelland, Maier & Neustadt, L.L.P.

(57) ABSTRACT

This mixed coal fuel is obtained by mixing a low-grade coal and residual coal. The residual coal is obtained by separating, through evaporation, a solvent from concentrated solids left over when a solution portion, which contains soluble coal components in solvent, is separated from a slurry obtained by mixing and heating coal and a solvent. Furthermore, the ratio (base/acid) of basic components to acidic components contained in ash of the residual coal is lower than that of the low-grade coal.

8 Claims, 5 Drawing Sheets

(51) Int. Cl.
*C10L 1/32* (2006.01)
*F23D 1/00* (2006.01)

(56) References Cited

FOREIGN PATENT DOCUMENTS

| JP | 2008 57892 | 3/2008 |
| JP | 2008-115369 A | 5/2008 |
| JP | 2009 215401 | 9/2009 |
| JP | 2011 80727 | 4/2011 |
| KR | 10-2009-0060339 A | 6/2009 |

OTHER PUBLICATIONS

Written Opinion of the International Searching Authority Issued Dec. 18, 2012 in PCT/JP12/76490 Filed Oct. 12, 2012.
International Search Report Issued Dec. 18, 2012 in PCT/JP12/76490 Filed Oct. 12, 2012.

* cited by examiner

COAL-BLENDED FUEL, METHOD FOR COMBUSTING THE SAME, AND COAL FUEL FOR USE IN COAL-BLENDED FUEL

TECHNICAL FIELD

The present invention relates to a coal-blended fuel used for combustion in coal-fired boilers, a method for combusting the same, and a coal fuel for use in such a coal-blended fuel.

BACKGROUND ART

Hitherto, bituminous coal (high-grade coal) has been often used as a coal fuel used for combustion in coal-fired boilers. However, in recent years, attempts have been increasingly made to combust low-grade coal (for example, subbituminous coal, brown coal, or the like) in the coal-fired boilers from the viewpoints of resource depletion issues, the expansion of resource options, and reductions in fuel costs.

However, the used of the low-grade coal for combustion in the coal-fired boilers has problems below. First, the ash of the low-grade coal contains large amounts of basic components. In combustion in the coal-fired boilers, combustion ash adheres to furnace walls, heating tubes, and the like in the boilers. The adhesion of combustion ash is likely to be caused when the content of each basic component contained in ash is high. As a result, the heat absorption efficiency may possibly be reduced. In addition, the low-grade coal contains a large amount of moisture. Therefore, the drying load of a crusher (mill) may possibly be increased. Furthermore, the low-grade coal has a lower heating value as compared to bituminous coal. From the above, the low-grade coal has lower combustion efficiency as compared to bituminous coal.

Therefore, a method for blending bituminous coal and low-grade coal is known as a technique attempted to solve the above problems. For example, Patent Literature 1 discloses a method for suppressing ash adhesion in a coal-fired boiler in such a way that a mixture prepared by mixing the combustion ash of bituminous coal containing small amounts of basic components with coal (Adaro coal (low-grade coal)) containing ash containing large amounts of basic components is used as a coal-blended fuel. As a result, it is cited that the basic components are diluted and therefore ash adhesion is reduced.

CITATION LIST

Patent Literature

PTL 1: Japanese Unexamined Patent Application Publication No. 11-82990

SUMMARY OF INVENTION

Technical Problem

However, in the case of blending bituminous coal and low-grade coal, a large amount of the bituminous coal is needed to dilute basic components contained in the ash of the low-grade coal. As a result, the proportion of the bituminous coal in a coal-blended fuel prepared by blending the bituminous coal and the low-grade coal is high and the coal-blending efficiency is low. In addition, in the method for reducing ash adhesion in the coal-fired boiler as disclosed in Patent Literature 1, combustion ash is mixed with Adaro coal and therefore a sufficient heating value is not available in some cases. Furthermore, the drying load of a crusher (mill) cannot be reduced in some cases.

Therefore, the present invention has been made in view of the above problems and it is an object of the present invention to provide a coal-blended fuel which can reduce ash adhesion with high coal-blending efficiency and can reduce the drying load of a crusher (mill) and which has a high heating value, a method for combust the same, and a coal fuel for use in the coal-blended fuel.

Solution to Problem

A coal-blended fuel according to the present invention is one produced by blending low-grade coal and residual coal which is obtained in such a way that slurry is prepared by mixing and heating coal and a solvent, a solid-concentrated solution is left by separating a solution fraction containing solvent-soluble coal components from the slurry, and the solvent is separated from the solid-concentrated solution by evaporation and which is lower in the ratio of basic components to acidic components contained in ash than the low-grade coal.

Advantageous Effects of Invention

In a coal-blended fuel according to the present invention, ash adhesion can be reduced with high coal-blending efficiency. In addition, the drying load of a crusher (mill) can be reduced and the heating value can be increased.

DESCRIPTION OF EMBODIMENTS

Figure 1:
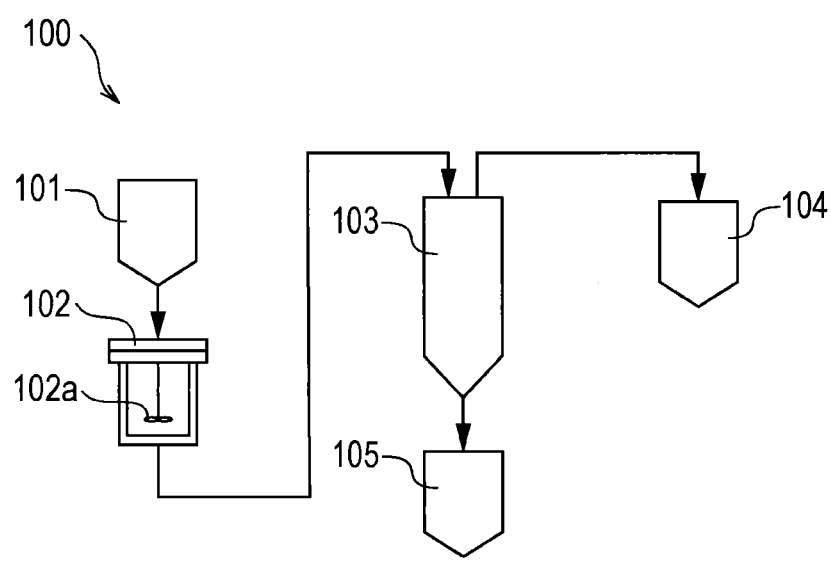
FIG. 1 is a schematic view of an apparatus for producing residual coal for use in a coal-blended fuel according to the present invention.

Embodiments of the present invention will now be described with reference to the drawings.

(Configuration of Coal-Blended Fuel)

A coal-blended fuel according to the present invention is one produced by blending low-grade coal and residual coal. First, the low-grade coal and residual coal for use in the coal-blended fuel are described.

(Low-Grade Coal)

The low-grade coal for use in the coal-blended fuel has a higher moisture content and a lower ash content as compared to high-grade coal such as bituminous coal. In particular, measures of the low-grade coal are that the content of moisture in coal is 20% to 35% by weight on an as-received basis (AR (as received), the content of moisture in coal is hereinafter expressed on an as-received basis) and the content of ash in coal is 8% by weight or less on a dry basis (DB (dry basis), the content of ash in coal is hereinafter expressed on an dry basis). It is desired that the content of moisture in coal is 20% to 35% by weight and the content of ash in coal is 4% by weight or less.

Examples of the low-grade coal include coals classified into Categories D, E, $F_1$, and $F_2$, specified in Japanese Industrial Standards (JIS M 1002:1978), that is, subbituminous coal and brown coal.

The coal classified into Category D is a type of so-called "subbituminous coal" having a heating value of 7,800 kcal/kg to less than 8,100 kcal/kg.

The coal classified into Category E is a type of so-called "subbituminous coal" having a heating value of 7,300 kcal/kg to less than 7,800 kcal/kg.

The coal classified into Category $F_1$ is a type of so-called "brown coal" having a heating value of 6,800 kcal/kg to less than 7,300 kcal/kg.

The coal classified into Category $F_2$ is a type of so-called "brown coal" having a heating value of 5,800 kcal/kg to less than 6,800 kcal/kg.

However, the low-grade coal may be any coal, having high moisture content and low ash content, other than subbituminous coal and brown coal.

In addition, examples of high-grade coal include coals classified into Categories $B_1$, $B_2$, and C specified in Japanese Industrial Standards (JIS M 1002:1978), that is, bituminous coal.

The coals classified into Categories $B_1$ and $B_2$ are types of so-called "bituminous coal" having a heating value of 8,400 kcal/kg or more.

The coal classified into Category C is a type of so-called "bituminous coal" having a heating value of 8,100 kcal/kg to less than 8,400 kcal/kg.

Incidentally, the heating value specified in Japanese Industrial Standards (JIS M 1002-1978) is a value calculated on the basis of the following equation and is on a dry, ash-free basis:

Heating value (on a corrective dry, ash-free basis)
=heating value/(100−1.08×ash−moisture)×100.

The low-grade coal contains ash usually containing large amounts of basic components and is higher in the ratio (hereinafter also referred to as Base (basic components)/Acid (acidic components)) of the basic components to acidic components contained in the ash as compared to the high-grade coal. Base/Acid is one obtained by dividing the sum of the basic components contained in the ash by the sum of the acidic components contained in the ash and is also referred to as a slagging evaluation index. The basic components contained in the ash are, for example, $Fe_2O_3$, CaO, $Na_2O$, $K_2O$, and MgO. On the other hand, the acidic components contained in the ash are, for example, $SiO_2$, $Al_2O_3$, and $TiO_2$. The proportion of each of the basic and acidic components contained in coal is measured by ICP emission spectrometry, atomic absorption spectroscopy, absorptiometry, combustion infrared absorption spectroscopy, X-ray fluorescence analysis, or the like.

The Base/Acid of the low-grade coal is often 0.15 or more. On the other hand, the Base/Acid of the high-grade coal is often less than 0.12. The threshold of evaluation with the slagging evaluation index (Base/Acid) varies. When the Base/Acid is less than 0.1, 0.1 to 0.3, or more than 0.3, the degree of ash adhesion (slagging) is rated as "slight", "medium", or "significant", respectively, in some cases (the more significant the degree is, the more likely ash adhesion is to occur). In this case, the degree of ash adhesion of the low-grade coal is rated as "medium" or "significant" and the degree of ash adhesion of the high-grade coal is rated as "slight" or "medium".

In the ash composition (the region Base/Acid<1) of usual coal, a basic component has the effect of reducing the melting point of ash. Therefore, the low-grade coal, which is usually high in Base/Acid, has a lower ash melting point as compared to the high-grade coal, which is low in Base/Acid. Therefore, the melt proportion of the ash of the low-grade coal is high. As a result, in the case of combusting the low-grade coal in a pulverized coal-fired boiler 2 (described below with reference to FIG. 2), ash adhesion (slagging) is likely to occur on a furnace wall (described below with reference to FIG. 2) and heating tube group 7 (described below with reference to FIG. 2) of a furnace 6 and therefore the heat absorption efficiency may possibly be reduced.

Herein, the term "melt proportion" refers to the proportion of a portion of solid ash with a certain amount, the portion being liquid under certain temperature-atmosphere conditions. The ash liquefied in a combustion field is suspended by a gas flow in the boiler to adhere to the furnace wall and heating tube group 7 of the furnace 6. For the melt proportion, a composition or phase in such a state that the ash of a coal fuel measured in advance is most thermodynamically stable under certain conditions (temperature, atmosphere gas composition), that is, the Gibbs free energy ($\Delta G$) is minimum is determined by thermodynamic equilibrium calculations. Incidentally, the melt proportion may be determined in such a way that the ash of a coal fuel is heated in advance and the melt proportion is measured at each temperature and atmosphere gas composition. This allows the melt proportion to be determined depending on the condition of an actual boiler.

It is difficult to use the low-grade coal alone in existing coal firing equipment (firing equipment including coal-fired boilers). This is because the content of moisture in coal is high and the Base/Acid is high as described above. When the content of moisture in coal is high, the drying load of a crusher (mill) 4 (described below with reference to FIG. 2) is high and the heating value is low. In addition, when the Base/Acid is low, ash adhesion is likely to occur. As a result, the low-grade coal has lower combustion efficiency as compared to the high-grade coal.

(Residual Coal)

The residual coal, which is used in the coal-blended fuel according to the present invention, is coal co-produced in a step of producing ashless coal. The ashless coal is coal produced by removing ash from coal. A method for producing the ashless coal is as described below. For example, slurry prepared by mixing coal used as feed with a solvent is heated, whereby coal components (hereinafter referred to as solvent-soluble components) soluble in the solvent are extracted. Thereafter, the slurry is separated into a solution fraction containing the solvent-soluble components and a solid-concentrated solution containing coal components (hereinafter referred to as solvent-insoluble components) insoluble in the solvent. The solvent is then separated from the solution fraction by evaporation, whereby the ashless coal is produced. On the other hand, the residual coal is produced in such a way that the solvent is separated from the remaining solid-concentrated solution by evaporation. Incidentally, a method for producing the residual coal (and the ashless coal) is described below in detail.

It is preferred that coal used as feed for the residual coal has a high heating value and is low in the ratio (Base/Acid) of basic components to acidic components contained in ash. The coal used as feed for the residual coal is preferably bituminous coal specified in Japanese Industrial Standards (JIS M 1002:1978).

However, the coal used as feed for the residual coal may be one, having lower Base/Acid as compared to the low-grade coal, other than the bituminous coal.

The residual coal has a higher ash content and a lower moisture content as compared to the low-grade coal. In particular, measures of the residual coal are that the content of moisture in coal is 8% by weight or less and the content of ash in coal is 17% to 25% by weight. It is desired that the content of moisture in coal is 5% by weight or less and the content of ash in coal is 17% to 22% by weight.

Furthermore, the residual coal is lower in the ratio (Base/Acid) of the basic components to the acidic components than the low-grade coal. In particular, the Base/Acid is less than 0.12. This is because ash properties of the coal used as feed for the residual coal are inherited to the residual coal (that is, ash properties of the coal used as feed for the residual coal are not varied in the step of producing the ashless coal).

As described above, the residual coal has high ash content and low moisture content. In addition, the residual coal is lower in Base/Acid than the low-grade coal. Since the moisture content is low, the residual coal has a higher heating value (the heating value equivalent to that of the high-grade coal) as compared to the low-grade coal. In addition, since the Base/Acid is low, ash adhesion (slagging) is unlikely to occur. Incidentally, the residual coal may be coal produced from solvent-insoluble components after a solvent extraction step (described below) or may use one, co-produced in a production step, other than the ashless coal.

(Method for Producing Residual Coal)

Herein, the method for producing the residual coal (and the ashless coal) is described in detail with reference to FIG. 1. FIG. 1 is a schematic view of an apparatus 100 for producing the residual coal for use in the coal-blended fuel according to the present invention. The method for producing the residual coal includes a slurry-preparing step, an extraction step, a separation step, an ashless coal-obtaining step, and a residual coal-obtaining step.

(Slurry-Preparing Step)

The slurry-preparing step is a step of preparing slurry by mixing coal with a solvent and is performed in a slurry preparation tank 101.

The solvent is not particularly limited and may be one dissolving coal. The solvent is preferably a dicyclic aromatic compound derived from coal. The dicyclic aromatic compound has a basic structure similar to the molecular structure of coal and therefore has high affinity to coal; hence, relatively high extractability can be achieved. Examples of the dicyclic aromatic compound derived from coal include methylnaphthalene oil and naphthalene oil which are distillates from by-product oil obtained in the course of producing coke by carbonizing coal.

The boiling point of the solvent is not particularly limited. The boiling point thereof is preferably 180° C. to 300° C. and particularly preferably 230° C. to 280° C. from the viewpoints of, for example, the extractability in the extraction step and the recovery rate of the solvent in the ashless coal-obtaining step.

The concentration of coal with respect to the solvent is not particularly limited. The concentration thereof is preferably within the range of 10% to 50% by weight and more preferably 15% to 35% by weight on a dry basis.

(Extraction Step)

The extraction step is a step of heating the slurry obtained in the slurry-preparing step to extract the solvent-soluble components and is performed in an extraction tank 102. The slurry prepared in the slurry preparation tank 101 is supplied to the extraction tank 102 with a pump (not shown) or the like, is heated, and is maintained at a predetermined temperature while being stirred with a stirrer 102a placed in the extraction tank 102, whereby extraction is performed. Incidentally, after being supplied to a preheater (not shown) and then heated to a predetermined temperature once, the slurry may be supplied to the extraction tank 102.

The heating temperature of the slurry in the extraction step is not particularly limited as long as the solvent-soluble components are dissolved. The heating temperature thereof is preferably within the range of 300° C. to 420° C. and more preferably 350° C. to 400° C. The heating time (extraction time) thereof is not particularly limited. The heating time thereof is preferably within the range of 5 minutes to 60 minutes and more preferably 20 minutes to 40 minutes. In the case of heating the slurry with the preheater (not shown) once, the heating time is the sum of the time taken to heat the slurry with the preheater and the time taken to heat the slurry in the extraction tank 102.

The extraction step is preferably performed in the presence of an inert gas, which is preferably nitrogen because of its inexpensiveness. The pressure in the extraction step depends on the temperature during extraction and is preferably within the range of 1.0 MPa to 2.0 MPa.

(Separation Step)

The separation step is a step of separating the slurry obtained in the extraction step into the solution fraction and the solid-concentrated solution using a gravity settling chamber 103 for separation by gravitational settling. The solution fraction is a solution fraction in which the solvent-soluble components are dissolved. The solid-concentrated solution is a slurry fraction containing the solvent-insoluble components. Incidentally, the slurry is separated by gravitational settling in this embodiment and may be separated by, for example, filtration or centrifugation.

(Ashless Coal-Obtaining Step)

The ashless coal-obtaining step is a step of obtaining the ashless coal by separating the solvent from the solution fraction by evaporation and is performed with a solvent recovery unit 104.

Separation by evaporation is a separation method including common distillation methods, evaporation methods (a spray draying method and the like), and the like. The solvent separated and recovered is circulated to the slurry preparation tank 101 and can be repeatedly used. The ashless coal contains very little ash, is free from moisture, and exhibits a heating value higher than that of, for example, coal for coke making. Furthermore, the ashless coal has significantly improved plastic properties which are important quality issues for coke feed and exhibits far more excellent performance (fluidity) as compared to, for example, coal for coke making. Thus, the ashless coal can be used as a coal blend for coke feed.

(Residual Coal-Obtaining Step)

The residual coal-obtaining step is a step of obtaining the residual coal by separating the solvent from the solid-concentrated solution, separated in the separation step, by evaporation and is performed with a solvent recovery unit 105.

Separation by evaporation is a separation method including common distillation methods, evaporation methods (a spray draying method and the like), and the like. The solvent separated and recovered is circulated to the slurry preparation tank 101 and can be repeatedly used. The separation and recovery of the solvent allows the residual coal, in which the solvent-insoluble components including ash and the like are concentrated, to be obtained from the solid-concentrated solution. The residual coal exhibits no plastic properties and is free from oxygen-containing functional groups. Therefore, in the case of using the residual coal as a coal blend, the residual coal does not inhibit plastic properties of other coals contained in the coal blend. Thus, the residual coal can be used as a portion of a coal blend for coke feed.

(Coal-Blended Fuel)

The coal-blended fuel according to the present invention is described below. The coal-blended fuel according to the present invention is one produced by blending the low-grade coal and the residual coal as described above.

The blend ratio (the proportion of the residual coal in the coal-blended fuel, which is produced by blending the low-grade coal and the residual coal) of the residual coal is preferably 25% to 50% by weight and more preferably 35% to 50% by weight on an as-received basis. When the blend ratio thereof is within the above range, the moisture content, ash content, heating value, and melt proportion of the coal-blended fuel according to the present invention can be adjusted to about 20% or less, about 15% or less, about 5,500 kcal/kg-GAD or more, and 60% or less, respectively. Thus, the coal-blended fuel, which is useful for common pulverized coal-firing equipment, is obtained. Incidentally, GAD (gross air dried) represents the gross heating value on an air-dried basis.

(Method for Combusting Coal-Blended Fuel)

Figure 2:
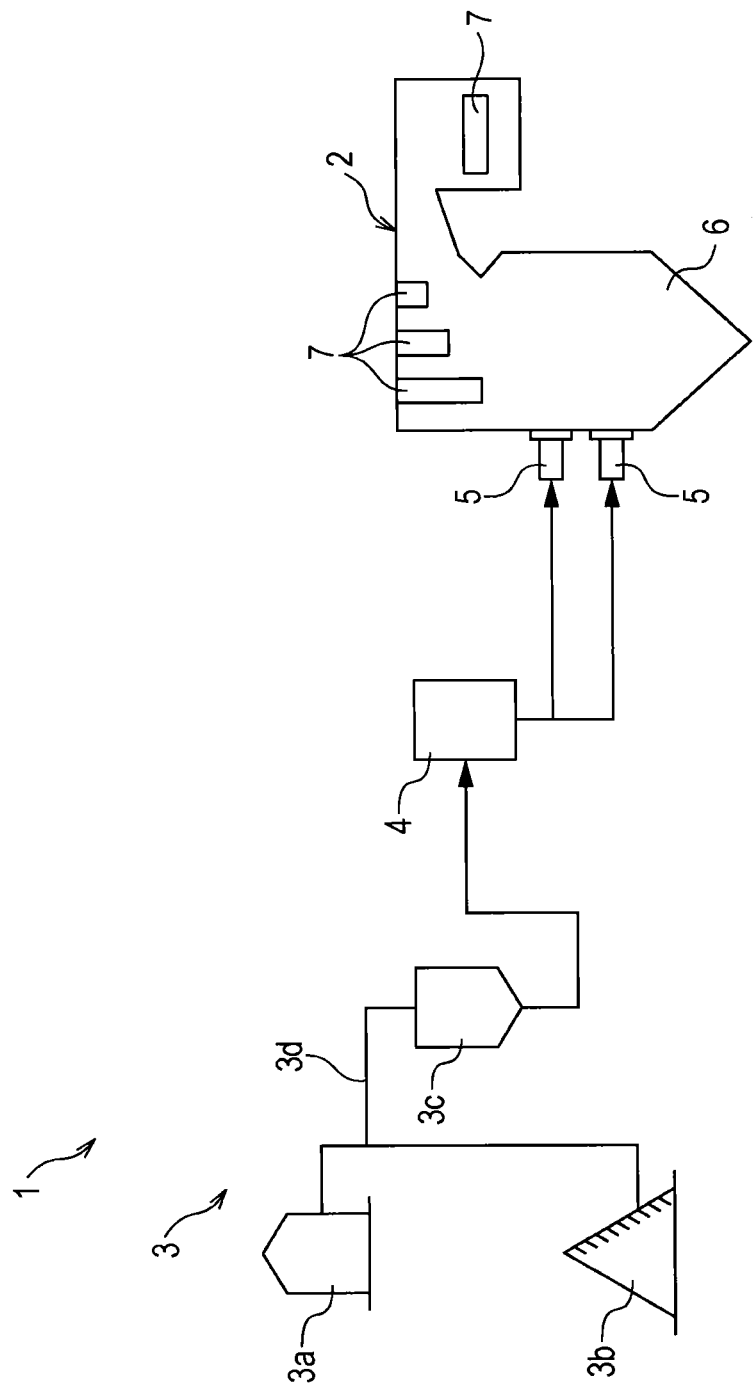
FIG. 2 is a schematic view of a coal combustion system for combusting a coal-blended fuel according to the present invention.
Figure 3:
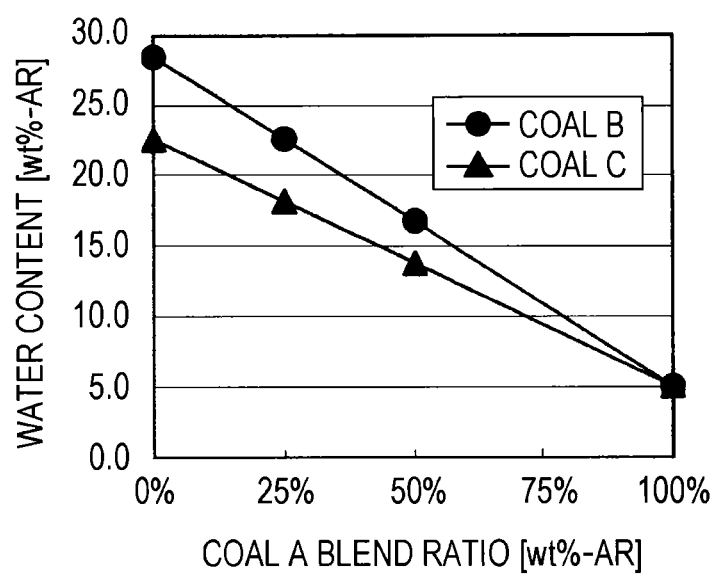
FIG. 3 is a graph showing the relationship between the blend ratio of residual coal and the moisture content.
Figure 4:
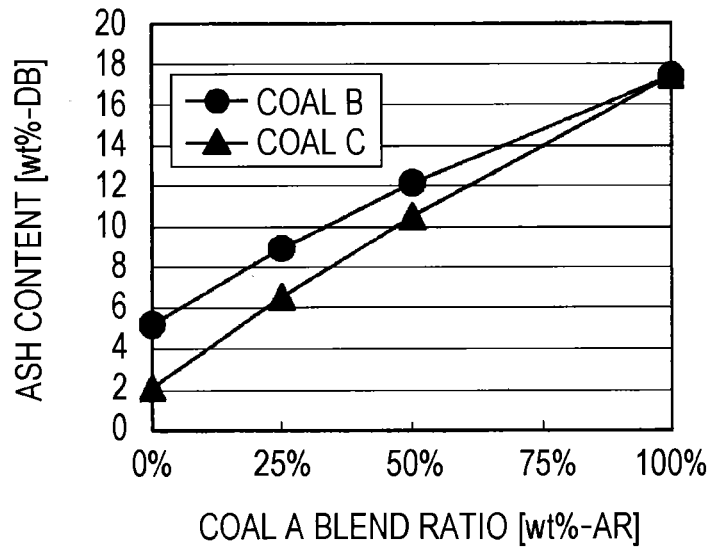
FIG. 4 is a graph showing the relationship between the blend ratio of residual coal and the ash content.
Figure 5:
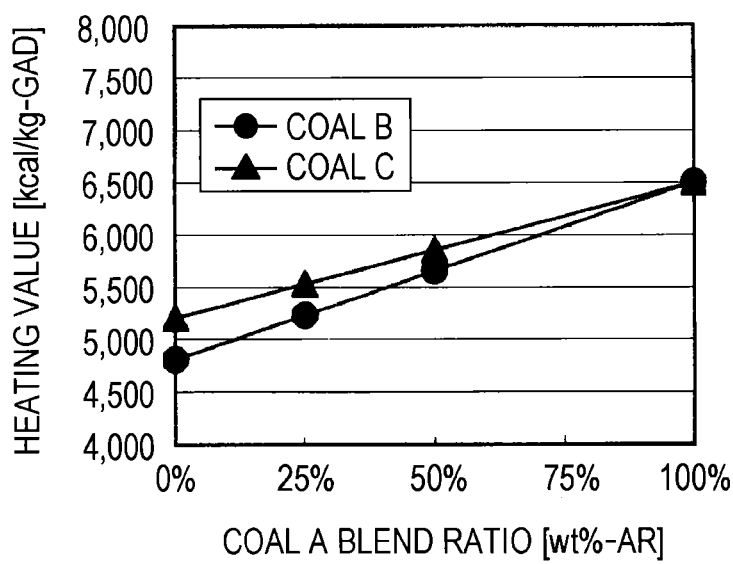
FIG. 5 is a graph showing the relationship between the blend ratio of residual coal and the heating value.
Figure 6:
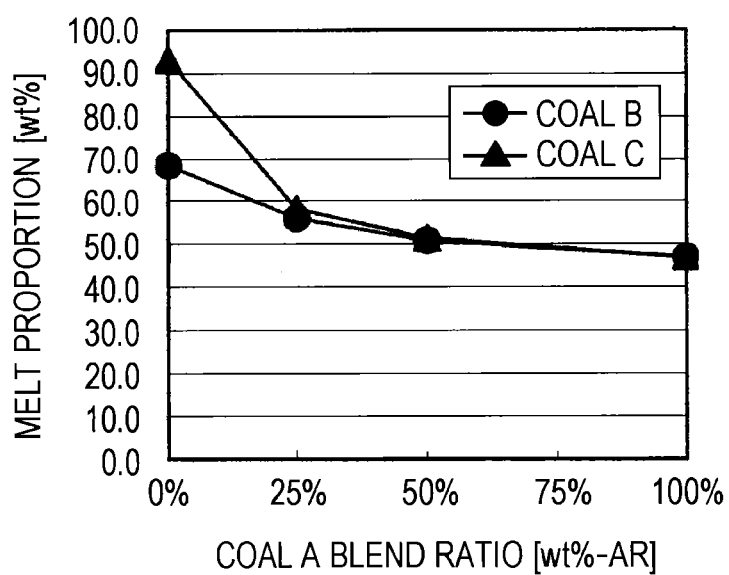
FIG. 6 is a graph showing the relationship between the blend ratio of residual coal and the melt proportion.

A method for combusting the coal-blended fuel according to the present invention is described below with reference to FIG. 2. FIG. 2 is a schematic view of a coal combustion system 1 for combusting the coal-blended fuel according to the present invention. As shown in FIG. 2, the coal combustion system 1 includes the coal-fired boiler 2 (pulverized coal-fired boiler) (hereinafter referred to as the boiler 2), a coal storage facility 3 including a coal silo 3a and/or a coal pile 3b and also including a coal hopper 3c, a crusher (mill) 4 which crushes the coal-blended fuel conveyed from the coal storage facility 3 into pulverized coal in such a way that the coal-blended fuel is contacted with hot air and is thereby dried, burners 5 for burning the pulverized coal in the boiler 2, and the like. Incidentally, the coal-blended fuel stored in the coal silo 3a and the coal pile 3b is conveyed to the coal hopper 3c with, for example, a belt conveyer 3d.

The coal-blended fuel conveyed from the coal storage facility 3 is crushed into the pulverized coal in the crusher (mill) 4. Furthermore, the coal-blended fuel crushed into the pulverized coal is fed into the boiler 2 together with air using a blower (not shown) and is burned in the burners 5. In the boiler 2, heat generated by combustion is recovered. The boiler 2 includes the furnace 6 and the heating tube group 7. The furnace 6 generates heat by burning the supplied pulverized coal in the burners 5. The heating tube group 7 is placed downward in an upper portion of the furnace 6 and recovers steam by heat exchange with combustion gas. The combustion gas coming from the boiler 2 is emitted through a smokestack. The heating tube group 7 includes a superheater, a reheater, an economizer, and the like. Incidentally, if any pulverized coal-fired boiler is not used, a step of pulverizing coal using the crusher (mill) 4 is not needed.

Before being supplied to the crusher 4, the low-grade coal and the residual coal are blended. This is because drying the low-grade coal, which has a high moisture content, in the crusher 4 alone causes an increase in drying load. The low-grade coal and the residual coal may be blended, for example, on the belt conveyer or in the coal storage facility 3 or may be blended before unloading (for example, in a coal carrier). Incidentally, while the drying load of the crusher 4 is increased, coal blending may be performed in the boiler 2 in such a way that after the low-grade coal and the residual coal are separately dried and are crushed into pulverized coal in the crusher 4 without being blended, the pulverized coal is burned in the burners 5 separately and is supplied into the boiler 2.

EXAMPLES

Coal A shown in Table 1 was used as residual coal. The term "Coal A" as used herein does not refer to "coal" in a tax system and is a nominal name. In addition, Coal B or C shown in Table 1 was used as low-grade coal. Bituminous coal specified in Japanese Industrial Standards (JIS M 1002-1978) was used as feed for Coal A. Coal A, which was the residual coal, was produced by the above-mentioned production method (the method including the slurry-preparing step, the extraction step, the separation step, and the residual coal-obtaining step). Brown coal specified in Japanese Industrial Standards (JIS M 1002-1978) was used for Coal B or C. Incidentally, in Table 1, the gross heating value is expressed in kcal/kg (AR). AR (as received) represents the heating value of coal on an as-received basis, that is, the heating value in a moist state. Thus, it is less than the heating value specified in Japanese Industrial Standards (JIS M 1002-1978). In addition, Coal B or C is classified as brown coal in Japanese Industrial Standards (JIS M 1002-1978) and is often classified as subbituminous coal in markets.

TABLE 1

|  |  | Coal A | Coal B | Coal C |
| --- | --- | --- | --- | --- |
| Moisture | % AR | 5.0 | 28.49 | 22.58 |
| Ash | % DB | 17.40 | 5.19 | 2.11 |
| Gross heating value | kcal/kg (AR) | 6.502 | 4.812 | 5.210 |
| $SiO_2$ | %-ash | 62.10 | 55.73 | 52.00 |
| $Al_2O_3$ | %-ash | 25.20 | 28.84 | 20.30 |
| CaO | %-ash | 3.52 | 1.86 | 6.03 |
| $Fe_2O_3$ | %-ash | 4.26 | 6.53 | 12.10 |
| MgO | %-ash | 0.96 | 2.57 | 1.90 |
| $TiO_2$ | %-ash | 1.41 | 0.55 | 1.08 |
| $Na_2O$ | %-ash | 0.21 | 2.13 | 0.39 |
| $K_2O$ | %-ash | 0.56 | 1.00 | 0.67 |
| $P_2O_5$ | %-ash | 0.73 | 0.15 | 0.13 |
| MnO | %-ash | 0.04 | 0.00 | 0.06 |
| $V_2O_5$ | %-ash | 0.07 | 0.00 | 0.02 |
| $SO_3$ | %-ash | 1.11 | 1.94 | 5.24 |

As shown in Table 1, Coal A, which is the residual coal, has low moisture content and high ash content. In addition, Coal A has a high heating value (equivalent to that of bituminous coal). On the other hand, Coal B or C, which is the low-grade coal, has low ash content and high moisture content. In addition, the ratio (Base/Acid) of basic components to acidic components contained in ash in Coal A is 0.11 (rated as "small" close to "medium"), that in Coal B is 0.17 (rated as "medium"), and that in Coal C is 0.29 (rated as "medium" close to "large") as calculated from each composition shown in Table 1 by the above-mentioned calculation method. It is clear that Coal B or C, which is the low-grade coal, is higher in Base/Acid than Coal A, which is the residual coal.

FIGS. 3 to 6 are graphs each showing the relationship between the blend ratio of Coal A and the moisture content, ash content, heating value, or melt proportion of a coal-blended fuel in the case of blending Coal A, which is the residual coal, with Coal B or C. The increase in blend ratio of Coal A reduces the moisture content and melt proportion of the coal-blended fuel (refer to FIGS. 3 and 6) and increases the heating value (refer to FIG. 5). As a result, the coal-blended fuel can be obtained such that the ash content is suppressed to substantially the same level as that of bituminous coal (refer to FIG. 4), ash adhesion can be reduced, the drying load of a crusher (mill) 4 can be reduced, and the heating value can be increased. Furthermore, when the blend ratio of Coal A is 25% to 50% by weight, the moisture content, ash content, heating value, and melt proportion of the coal-blended fuel can be adjusted to about 20% or less, 15% or less, 5,500 kcal/kg-GAD or more, and 60% or less, respectively. As a result, the coal-blended fuel can be made useful for the coal combustion system 1. Incidentally, in FIG. 4, DB (dry basis) represents the ash content on a dry basis. In addition, in FIG. 5, GAD (gross air dried) represents the gross heating value on an air-dried basis. Furthermore, in FIG. 6, the melt proportion refers to the proportion of a liquid under atmosphere conditions including a temperature of 125° C. and an air ratio of 0.8.

(Effect 1)

Effects of the coal-fired boiler according to the present invention are described below. The coal-fired boiler according to the present invention is produced by blending the low-grade coal and the residual coal. The residual coal is obtained in such a way that slurry is prepared by mixing and heating coal and a solvent, a solid-concentrated solution is left by separating a solution fraction containing solvent-soluble coal components from the slurry, and the solvent is separated from the solid-concentrated solution by evaporation. In addition, the residual coal is lower in the ratio (Base/Acid) of basic components to acidic components contained in ash than the low-grade coal.

(Effect 1-1)

The Base/Acid of the residual coal is lower than the Base/Acid of the low-grade coal. Hence, the Base/Acid of the coal-blended fuel according to the present invention is diluted and therefore is lower than the Base/Acid of the low-grade coal. Thus, the melting point of the coal-fired boiler is low and the melt proportion of the ash of coal-blended fuel is low. As a result, even if the coal-blended fuel is combusted in the coal-fired boiler 2, slagging is unlikely to occur on the furnace wall and heating tube group 7 of the furnace 6. Furthermore, the residual coal has an ash content higher than that of the high-grade coal, such as bituminous coal. Hence, the melt proportion can be reduced with a smaller amount of mixed coal as compared to the case where the high-grade coal such, as bituminous coal, is blended with the low-grade coal. Thus, the coal-blended fuel according to the present invention has higher coal-blending efficiency as compared to coal-blended fuels produced by blending the high-grade coal such, as bituminous coal, with the low-grade coal. As a result, a large amount of the low-grade coal can be used. This leads to the reduction in cost of the coal-blended fuel.

(Effect 1-2)

The residual coal has a lower moisture content as compared to the low-grade coal. Hence, the moisture content of the coal-blended fuel according to the present invention is lower than the moisture content of the low-grade coal. Thus, the drying load of the crusher (mill) 4 can be reduced. In addition, the coal-blended fuel has a higher heating value as compared to the low-grade coal because the moisture content thereof is low.

According to Effects 1-1 and 1-2, the coal-blended fuel according to the present invention can further enhance the combustion efficiency as compared to the low-grade coal and can be used as a coal fuel similar to bituminous coal. In addition, since the low-grade coal and the residual coal are blended, a disadvantage the low-grade coal has high moisture content and high Base/Acid and a disadvantage the residual coal has high ash content can be offset in the coal-blended fuel. As a result, the low-grade coal and the residual coal can be effectively used, whereas it is difficult to use the low-grade coal and the residual coal alone as a coal fuel.

(Effect 2)

The low-grade coal has a moisture content of 20% to 35% by weight and an ash content of 8% by weight or less. Furthermore, the residual coal has a moisture content of 8% by weight or less and an ash content of 17% to 25% by weight. Thus, effects such as the reduction of ash adhesion, the reduction in drying load of the crusher (mill) 4, and the increase of the heating value can be reliably achieved.

(Effect 3)

The blend ratio (the proportion of the residual coal in the coal-blended fuel, which is produced by blending the low-grade coal and the residual coal) of the residual coal is 25% to 50% by weight. As a result, the moisture content, ash content, heating value, and melt proportion of the coal-blended fuel according to the present invention can be adjusted to about 20% or less, 15% or less, about 5,500 kcal/kg-GAD or more, and 60% or less, respectively. Thus, the coal-blended fuel, which is useful for the pulverized-coal combustion system 1, is obtained.

(Effect 4)

Brown coal or subbituminous coal specified in Japanese Industrial Standards (JIS M 1002:1978) is used as the low-grade coal and bituminous coal specified in Japanese Industrial Standards (JIS M 1002:1978) is used as feed for the residual coal. Hence, the coal-blended fuel according to the present invention can be readily produced because multi-purpose coal materials are used.

(Effect 5)

The method for combusting the coal-blended fuel according to the present invention is a combustion method in which the coal-blended fuel according to the present invention is combusted in the boiler 2. Thus, the operation (the combustion of a coal fuel) of the boiler 2 can be performed with high combustion efficiency in such a way that ash adhesion can be reduction and the heating value is increased.

(Effect 6)

Furthermore, the method for combusting the coal-blended fuel according to the present invention is a combustion method in which the coal-blended fuel is crushed into pulverized coal, which is then injected into the boiler 2 together with air. Thus, the combustion efficiency can be further increased.

(Effect 7)

Furthermore, the method for combusting the coal-blended fuel according to the present invention is a combustion method in which before being crushed into pulverized coal, the coal-blended fuel is mixed. Hence, when the coal-blended fuel is dried and is crushed into pulverized coal in the crusher 4, the drying load of the crusher 4 can be reduced as compared to the low-grade coal.

(Effect 8)

The residual coal, which is a coal fuel contained in the coal-blended fuel according to the present invention, is obtained in such a way that slurry is prepared by mixing and heating coal and the solvent, the solid-concentrated solution is left by separating the solution fraction containing the solvent-soluble coal components from the slurry, and the solvent is separated from the solid-concentrated solution by evaporation. Furthermore, the residual coal has a Base/Acid of less than 0.12, a moisture content of 8% by weight, and an ash content of 17% to 25% by weight. Hence, the solid-concentrated solution remaining in the ashless coal-producing step can be effectively used. In addition, since the Base/Acid is low and the ash content is high, the Base/Acid of coal such as low-grade coal with high Base/Acid can be diluted at low blend ratio. As a result, the coal-blending efficiency is high and the moisture content is low; hence, the drying load of the crusher (mill) 4 can be reduced and the heating value is high. From the above, the residual coal is suitable for a coal fuel blended with low-grade coal.

While the present invention has been described in detail with reference to specific embodiments, it is apparent to those skilled in the art that a variety of changes and modifications can be made without departing from the spirit and scope of the present invention.

This application is based on a Japanese patent application (Japanese Patent Application No. 2011-226137) filed Oct. 13, 2011, the disclosure of which is incorporated herein by reference.

INDUSTRIAL APPLICABILITY

The present invention is suitable for use in coal-fired boilers using low-grade coal.

REFERENCE SIGNS LIST

1 Coal combustion system
2 Coal-fired boiler (boiler)
3 Coal storage facility
4 Crusher
5 Burners
6 Furnace
7 Heating tube group
100 Ashless coal production apparatus

The invention claimed is:

1. A coal-blended fuel comprising, in blended form:
a low-grade coal which is a brown coal or subbituminous coal; and
a residual coal,
wherein the coal-blended fuel is in blended form prior to any crushing of the low-grade coal and the residual coal,
wherein the residual coal is obtained by a process comprising:
mixing and heating a feed coal and a solvent to form a slurry;
separating a solution fraction comprising solvent-soluble coal components from the slurry to obtain a solid-concentrated solution; and
separating the solvent from the solid-concentrated solution by evaporation to obtain the residual coal, wherein:
the residual coal has a lower ratio of basic components to acidic components contained in ash than the low-grade coal,
the low-grade coal has a moisture content of 20% to 35% by weight;
the low-grade coal has an ash content of 8% by weight or less;
the residual coal has a moisture content of 8% by weight or less; and
the residual coal has an ash content of 17% to 25% by weight.

2. The coal-blended fuel of claim 1, wherein the blend ratio of the residual coal is 25% to 50% by weight.

3. The coal-blended fuel of claim 1, wherein the feed coal used to produce the residual coal is a bituminous coal.

4. A method for combusting a coal-blended fuel comprising:
supplying the coal-blended fuel of claim 1 to a boiler; and
combusting the coal-blended fuel.

5. The method of claim 4, further comprising:
crushing the coal-blended fuel to form a pulverized coal prior to supplying the fuel to the boiler;
injecting the pulverized coal and air into the boiler; and
combusting the pulverized coal and air in the boiler.

6. A method for producing a coal-blended fuel according to claim 1, the method comprising:
mixing and heating a feed coal and a solvent to form a slurry;
separating a solution fraction comprising solvent-soluble coal components from the slurry to obtain a solid-concentrated solution;
separating the solvent from the solid-concentrated solution by evaporation to obtain a residual coal; and
mixing the residual coal with a low grade coal which is a brown coal or a subbituminous coal, wherein:
the residual coal has a lower ratio of basic components to acidic components contained in ash than the low-grade coal,
the low-grade coal has a moisture content of 20% to 35% by weight;
the low-grade coal has an ash content of 8% by weight or less;
the residual coal has a moisture content of 8% by weight or less; and
the residual coal has an ash content of 17% to 25% by weight.

7. The method of claim 6, wherein the blend ratio of the residual coal is 25% to 50% by weight.

8. The method of claim 6, wherein the feed coal used to produce the residual coal is a bituminous coal.

* * * * *